United States Patent
Ichimoto et al.

(10) Patent No.: US 7,958,858 B2
(45) Date of Patent: Jun. 14, 2011

(54) VARIABLE VALVE TIMING SYSTEM AND METHOD FOR CONTROLLING THE SAME

(75) Inventors: Kazuhiro Ichimoto, Nishikamo-gun (JP); Makoto Yamazaki, Gotenba (JP); Tsukasa Abe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 439 days.

(21) Appl. No.: 12/293,831

(22) PCT Filed: Aug. 29, 2007

(86) PCT No.: PCT/IB2007/002480
§ 371 (c)(1),
(2), (4) Date: Sep. 22, 2008

(87) PCT Pub. No.: WO2008/029241
PCT Pub. Date: Mar. 13, 2008

(65) Prior Publication Data
US 2010/0224153 A1    Sep. 9, 2010

(30) Foreign Application Priority Data

Aug. 29, 2006 (JP) ................................ 2006-232355

(51) Int. Cl.
*F01L 1/34* (2006.01)
(52) U.S. Cl. ................ 123/90.17; 123/90.15; 123/90.31
(58) Field of Classification Search ................ 123/90.15, 123/90.17, 90.31
See application file for complete search history.

(56) References Cited

U.S. PATENT DOCUMENTS

| | | | |
|---|---|---|---|
| 5,937,808 A | 8/1999 | Kako et al. | |
| 6,161,511 A | 12/2000 | Hashimoto | |
| 6,397,803 B1 * | 6/2002 | Fujiwara et al. | 123/90.15 |
| 2003/0221648 A1 | 12/2003 | Ichimoto et al. | |
| 2005/0211207 A1 | 9/2005 | Urushihata et al. | |
| 2007/0125332 A1 | 6/2007 | Inoue et al. | |

FOREIGN PATENT DOCUMENTS

| | | |
|---|---|---|
| JP | 11 153008 | 6/1999 |
| JP | 2003 295953 | 10/2003 |
| JP | 2004 156461 | 6/2004 |
| JP | 2005 48707 | 2/2005 |
| JP | 2005 98142 | 4/2005 |

* cited by examiner

*Primary Examiner* — Zelalem Eshete
(74) *Attorney, Agent, or Firm* — Oblon, Spivak, McClelland, Maier & Neustadt, L.L.P.

(57) ABSTRACT

A variable valve timing system changes a valve phase by reducing an operation amount of an actuator at a speed reduction ratio that varies depending on a phase region. When the valve phase is outside a region in which the ratio of the amount of change in the phase with respect to the operation amount of the actuator is low, namely a high speed reduction ratio, the actuator may be operated due to, for example, a reaction force applied to a camshaft, and an undesirable valve phase change may result. Accordingly, when an engine stop command is possibly issued, the target phase value is restricted to a region more delayed than a phase restriction value set in consideration of the amount by which the valve timing can be changed from when an engine stop command is issued until when the engine is stopped.

22 Claims, 13 Drawing Sheets

VARIABLE VALVE TIMING SYSTEM AND METHOD FOR CONTROLLING THE SAME

BACKGROUND OF THE INVENTION

1. Field of the Invention

The invention relates generally to a variable valve timing system and a method for controlling the same, and, more specifically, to a variable valve timing system that includes a mechanism which changes the ratio of the amount of change in the opening/closing timing of a valve with respect to the operation amount of an actuator depending on the phase region in which the opening/closing timing is present, and a method for controlling the same.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

With a variable valve timing system that hydraulically drives a camshaft, the variable valve timing control is sometimes not executed as accurately as it should be, in a cold environment or at the time of start-up of the engine. Such inconvenience is caused because the hydraulic pressure used to drive the camshaft is insufficient or the response of the camshaft to the hydraulic control is slow in such occasions. To obviate such inconveniences, a variable valve timing system that drives a camshaft by means of an electric motor has been suggested, as described in, for example, Japanese Patent Application Publication No. JP-2005-98142 (JP-A-2005-98142), Japanese Patent Application Publication No. JP-2005-48707 (JP-A-2005-48707), and Japanese Patent Application Publication No. 2004-156461 (JP-A-2004-156461).

JP-A-2005-98142 and JP-A-2005-48707 each describe a variable valve timing system that changes the rotational phase of a camshaft relative to a crankshaft, namely, the valve timing in accordance with the rotational phase difference between a sprocket and a guide rotating body that is rotated by an electric motor. JP-A-2005-98142 describes a mechanism that changes the ratio of the amount of change in the rotational phase of a camshaft relative to a crankshaft (valve timing), with respect to the amount of change in the rotational phase of a guide rotating body relative to a sprocket depending on the phase region in which the phase of the valve timing is present. As shown in FIG. 16 in JP-A-2005-98142, the above-described change-amount ratio is relatively low in the phase region in which the valve timing is delayed, while the above-described change-amount ratio is relatively high in the phase region in which the valve timing is advanced.

With the configuration described in each of JP-A-2005-98142 and JP-A-2005-48707, the valve timing is changed by reducing the relative rotational speed between the output shaft of the electric motor that rotates the guide rotating body and the sprocket at the speed reduction ratio corresponding to the above-described change-amount ratio. Namely, with the configuration described in JP-A-2005-98142, the speed reduction ratio is variably set based on the phase region in which the phase of the valve timing is present.

Accordingly, in the phase region in which the speed reduction ratio is low, that is, the phase region in which the amount of change in the valve timing with respect to the relative rotational speed between the output shaft of the electric motor and the sprocket is large, the valve timing may be undesirably changed due to the rotation of the output shaft of the electric motor, which is caused by a reaction force applied to the camshaft, when the engine is stopped.

SUMMARY OF THE INVENTION

The invention provides a variable valve timing system that prevents occurrence of an undesirable change in the valve timing when an engine is being stopped, and a method for controlling the same.

A first aspect of the invention relates to a variable valve timing system that changes the opening/closing timing of at least one of an intake valve and an exhaust valve provided in an engine, and that includes a changing mechanism, a target phase setting unit, a phase control unit, and a target phase restriction unit. The changing mechanism changes the opening/closing timing by changing the rotational phase difference between a camshaft, which drives the valve of which the opening/closing timing is changed, and a crankshaft by an amount of change corresponding to the operation amount of an actuator, when the engine is operating. The changing mechanism sets the ratio of the amount of change in the opening/closing timing with respect to the operation amount of the actuator to a lower value when the opening/closing timing is within the first phase region than when the opening/closing timing is within the second phase region. The target phase setting unit sets the target opening/closing timing of at least one of the intake valve and the exhaust valve based on the operating state of the engine. The phase control unit sets the operation amount of the actuator based on the result of comparison between the target opening/closing timing and the actual opening/closing timing. The target phase restriction unit restricts the target opening/closing timing used when the engine is operating such that the opening/closing timing is brought into the first phase region by the time the engine is stopped, by the operation of the actuator after a command to stop the engine is issued.

With the variable valve timing system according to the first aspect of the invention, the target phase of the opening/closing timing (hereinafter, sometimes referred to as the "valve timing") of the valve during the operation of the engine is restricted. Thus, the valve timing is brought into the first phase region, in which the ratio of the amount of change in the phase with respect to the operation amount of the actuator is low (namely, the speed reduction ratio is high), by the operation of the actuator from when the command to stop the engine is issued until when the engine is stopped. As a result, it is possible to prevent occurrence of an undesirable change in the valve timing when the engine is being stopped.

In the first aspect of the invention, the target phase restriction unit may restrict the target opening/closing timing to the first phase region when the engine is being started.

Thus, even when a command to stop the engine is issued in response to the operation to turn off an ignition switch performed by the driver while the engine is being started, the valve timing is maintained within the first phase region. As a result, it is possible to prevent occurrence of an undesirable change in the valve timing.

In the first aspect of the invention, the target phase restriction unit may restrict the target opening/closing timing to a restriction range that includes the first phase region and a phase region that has a phase difference of equal to or smaller than a given amount with the first phase region, when a vehicle is not running.

Thus, when the vehicle is not running, namely, when there is a high possibility that an engine stop command is issued in response to the operation performed by the driver to turn off the ignition switch or an engine stop command is automatically issued in a vehicle in which the engine intermittent operation is performed such as a hybrid vehicle, the valve timing is prevented from being apart from the first phase region by a large amount. Accordingly, when an engine stop command is issued while the vehicle is not running, the valve timing is reliably brought into the first phase region by the time the engine is stopped. As a result, it is possible to prevent occurrence of an undesirable change in the valve timing when the engine is being stopped.

In the first aspect of the invention, the variable valve timing system may further include a variable restriction range setting unit. The variable restriction range setting unit sets the given amount that defines the restriction range, to which the target opening/closing timing is restricted by the target phase restriction unit, based on a temperature of the engine. The variable restriction range setting unit may set the given amount to a relatively small value when the temperature of the engine is low.

Thus, even when the engine temperature is low, that is, when it is difficult to achieve the required operation amount of the actuator and the required rate of change in the valve timing due to an increase in the viscosity of the lubricating oil, the valve timing is restricted to the restriction range that includes the first phase region. As a result, even when the temperature of the engine is low, it is possible to prevent occurrence of an undesirable change in the valve timing when the engine is being stopped.

In the first aspect of the invention, the first phase region may include the most delayed phase and the most advanced-side phase of the first phase region may be more delayed than a predetermined phase, and the target phase setting unit may set the target opening/closing timing to the opening/closing timing at the most delayed phase after the command to stop the engine is issued.

Thus, even when the start-time pressure reduction control is executed to suppress vibration of the engine by reducing a torque produced by the initial expansion of the air-fuel mixture that takes place in the engine while the engine is being started, it is possible to prevent occurrence of an undesirable change in the valve timing when the engine is being stopped.

In the first aspect of the invention, the actuator may be formed of an electric motor, and the operation amount of the actuator may correspond to the rotational speed of the electric motor relative to the rotational speed of the camshaft.

Thus, when the actuator is formed of the electric motor and the operation amount of the actuator corresponds to the rotational speed of the electric motor relative to the rotational speed of the camshaft, it is possible to prevent occurrence of an undesirable change in the valve timing when the engine is being stopped.

A second aspect of the invention relates to a method for controlling a variable valve timing system that changes the opening/closing timing of at least one of an intake valve and an exhaust valve provided in an engine, and that includes a changing mechanism that changes the opening/closing timing by changing the rotational phase difference between a camshaft, which drives the valve of which the opening/closing timing is changed, and a crankshaft by an amount of change corresponding to the operation amount of an actuator, when the engine is operating. The changing mechanism sets the ratio of the amount of change in the opening/closing timing with respect to the operation amount of the actuator to a lower value when the opening/closing timing is within the first phase region than when the opening/closing timing is within the second phase region. According to the method, the target opening/closing timing of at least one of the intake valve and the exhaust valve is set based on the operating state of the engine, and the operation amount of the actuator is set based on the result of comparison between the target opening/closing timing and the actual opening/closing timing. The target opening/closing timing used when the engine is operating is restricted such that the opening/closing timing is brought into the first phase region by the time the engine is stopped, by the operation of the actuator after a command to stop the engine is issued.

With the variable valve timing system and the method for controlling the same according to the aspects of the invention described above, it is possible to prevent occurrence of an undesirable change in the valve timing when the engine is being stopped

BRIEF DESCRIPTION OF THE DRAWINGS

The foregoing and further objects, features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Figure 1:
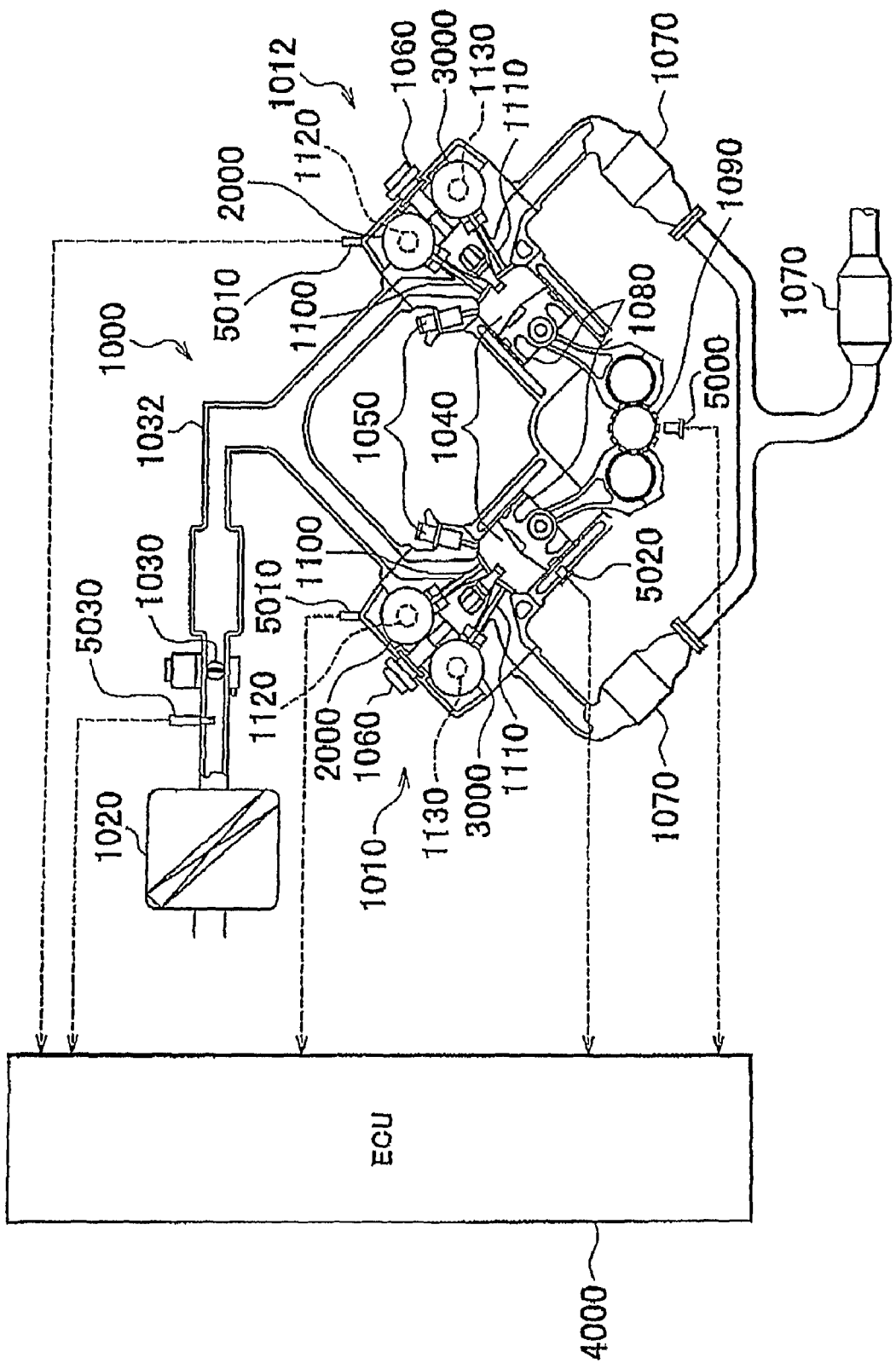
FIG. 1 is a view schematically showing the structure of a vehicle engine provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

First, a vehicle engine provided with a variable valve timing system according to the embodiment of the invention will be described with reference to FIG. 1.

An engine 1000 is an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
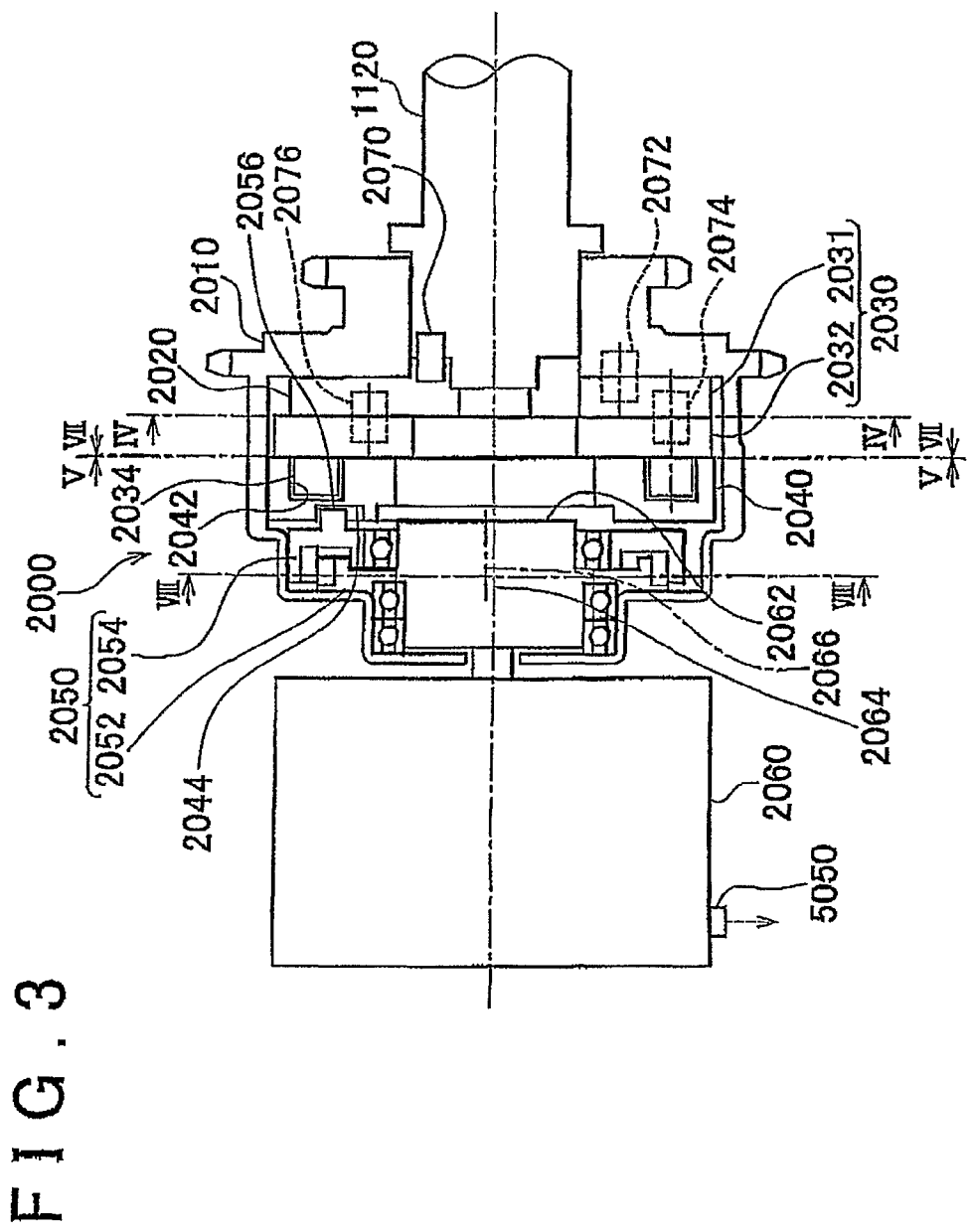
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

According to the embodiment of the invention, the ECU 4000 sets the target phase of the intake valve 1100, which corresponds to the current engine operating state, based on the map that uses parameters indicating the engine operating state, typically, the map that uses the engine speed NE and the intake air amount KL as parameters. Generally, multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below. Alternatively, each of the intake VVT mechanism 2000 and the exhaust VVT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
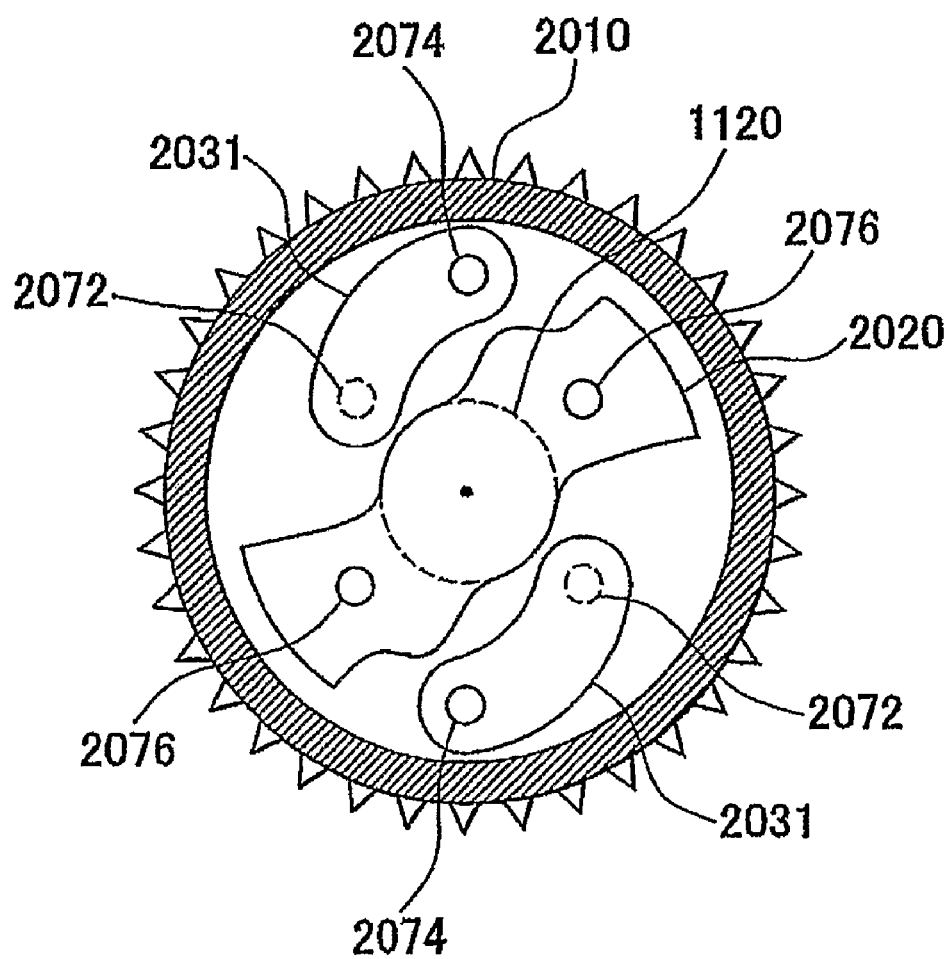
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the intake camshaft 1120. Each first arm 2031 is connected to the sprocket 2010 so as to pivot about a second pin 2072.

Figure 5:
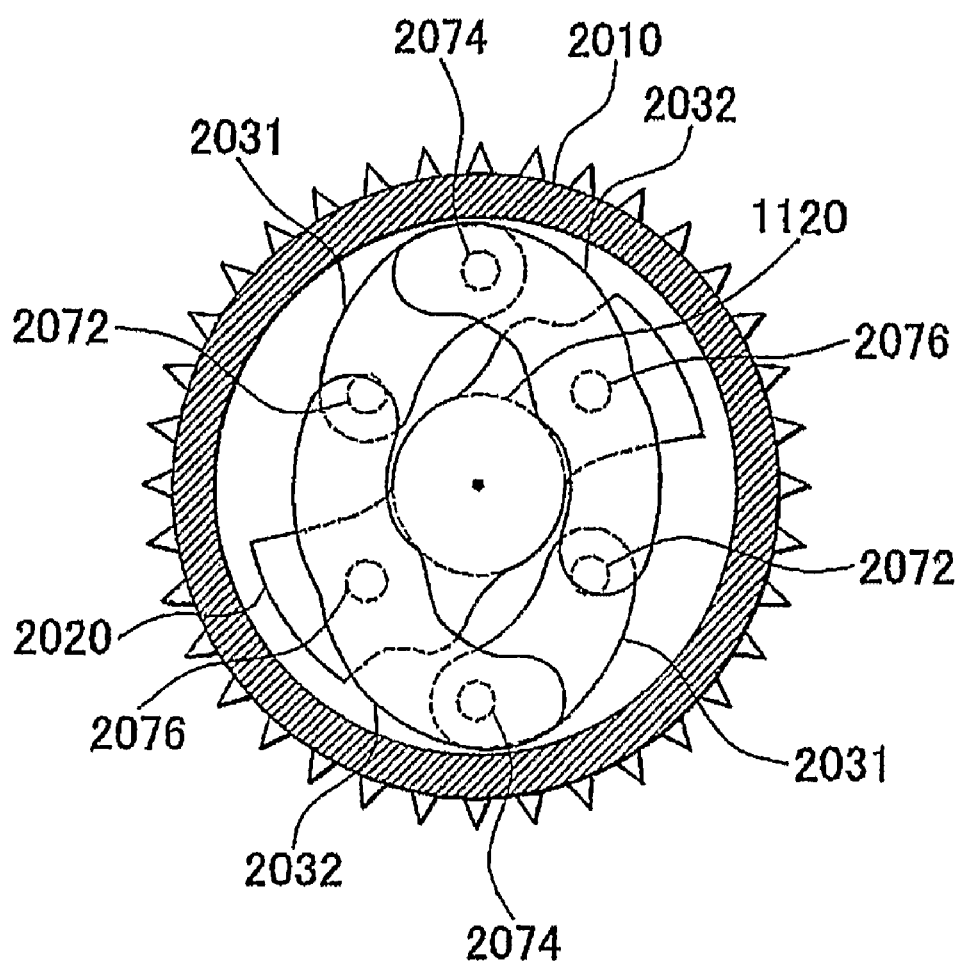
FIG. 5 is a first cross-sectional view taken along the line V-V in FIG. 3.
Figure 6:
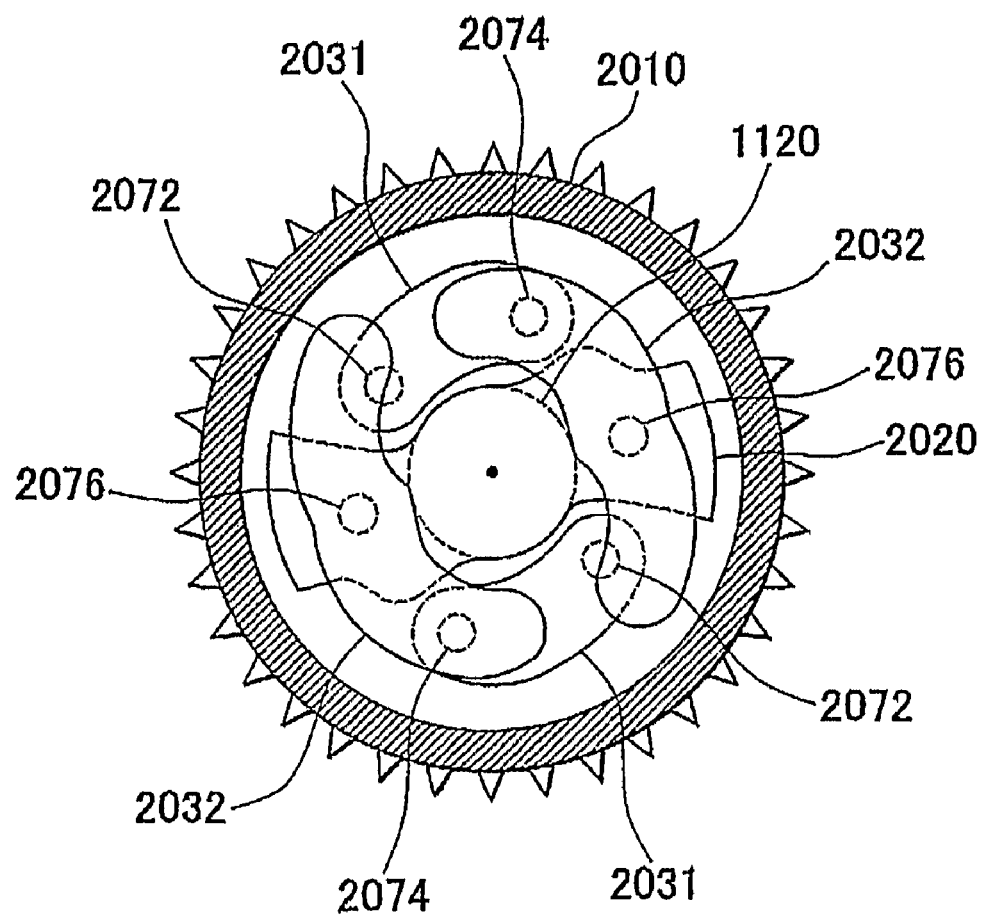
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 1100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
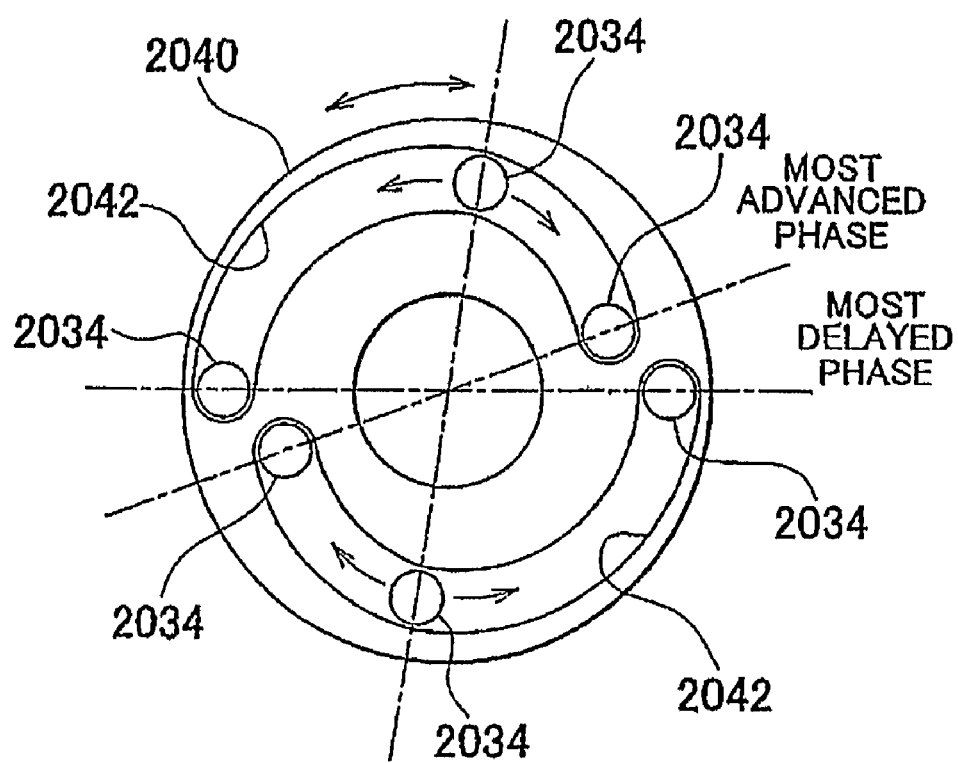
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
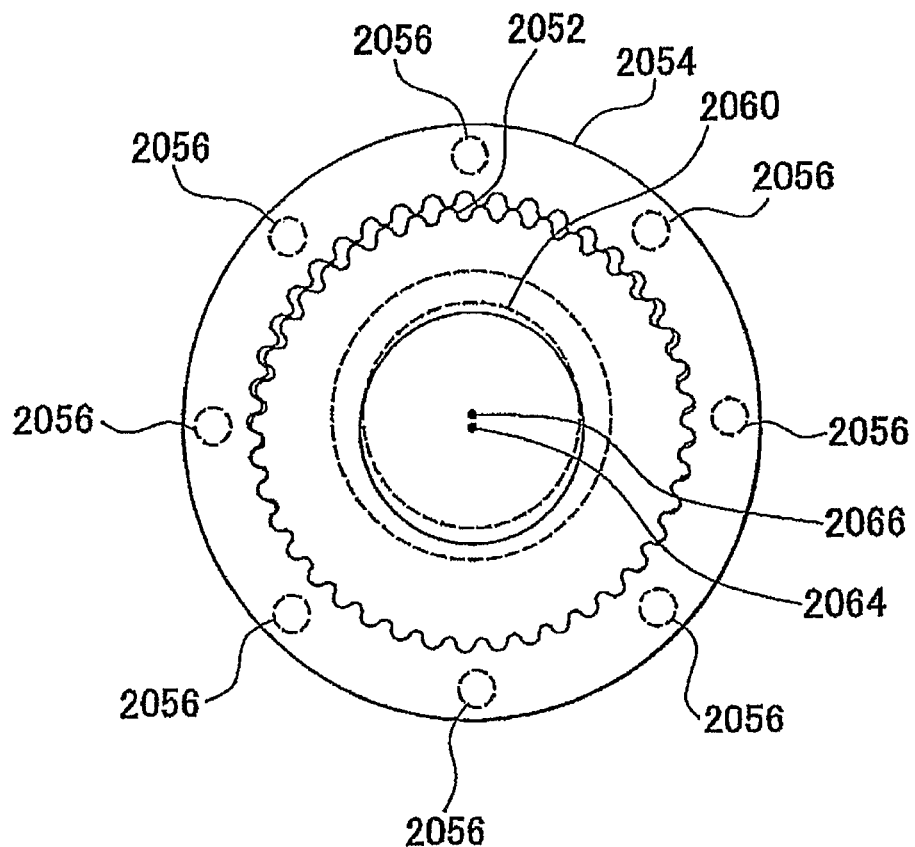
FIG. 8 is a cross-sectional view taken along the line VIII-VIII in FIG. 3.

FIG. 8 shows a cross-sectional view taken along the line in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

As can be seen from the structure described above, it is difficult to change the phase of the intake valve 1100 by solely rotating the internally-toothed gear 2054 using the electric motor 2060 when the engine 1000 is stopped, namely, when the rotation of the sprocket 2010 is stopped. That is, it is difficult for the intake VVT mechanism 2000 to change the valve timing after the engine 1000 is stopped.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" where appropriate) is detected based on the signal output from the motor rotational angle sensor 5050.

Figure 9:
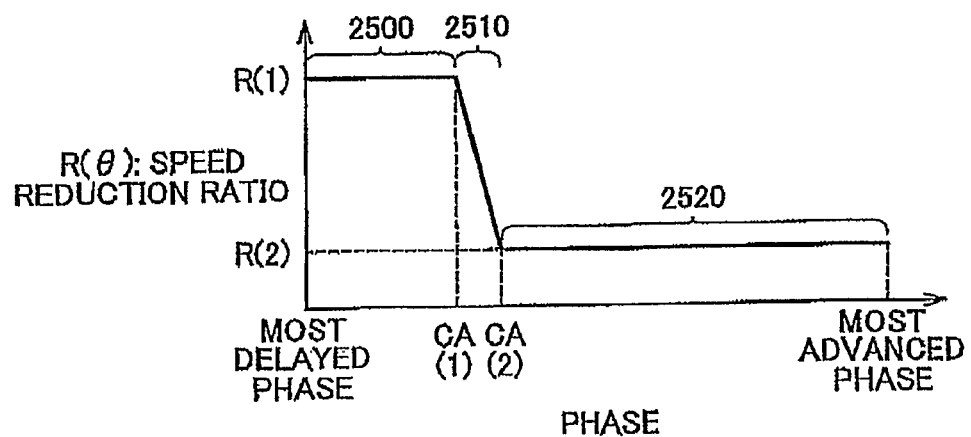
FIG. 9 is a graph showing the speed reduction ratio that the elements of the intake VVT mechanism realize in cooperation.

As shown in FIG. 9, the speed reduction ratio R ($\theta$) that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within a phase region 2500 that extends from the most delayed phase to CA1, the speed reduction ratio that the elements of the intake VVT mechanism 2000 realize in cooperation is R1. When the phase of the intake valve 1100 is within a phase region 2520 that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within a phase region 2510 that extends from CA1 to CA2, the speed reduction ratio that the elements of the intake VVT mechanism 2000 realize in cooperation changes at a predetermined rate ((R2−R1)/(CA2−CA1)).

The effects of the thus configured intake VVT mechanism 2000 of the variable valve timing system according to the embodiment of the invention will be described below.

Figure 10:
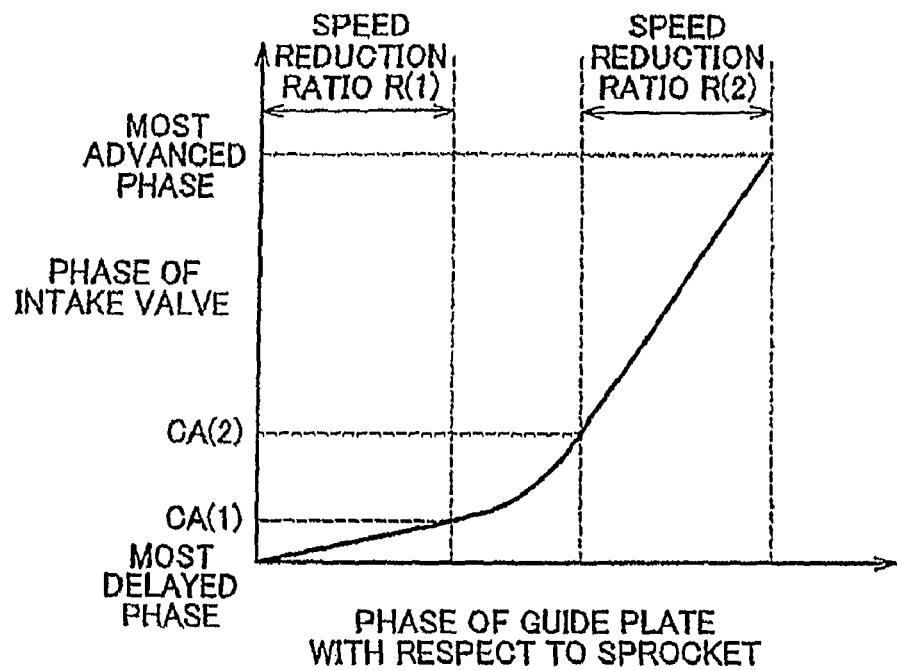
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the phase region 2500 that extends from the most delayed phase to CA1, the relative rotational speed between the output shaft of the electric motor 2060 and the sprocket 2010 is reduced at the speed reduction ratio R1. As a result, the phase is delayed. When the phase of the intake valve 1100 is within the phase region 2520 that extends from CA2 to the most advanced phase, the relative rotational speed between the output shaft of the electric motor 2060 and the sprocket 2010 is reduced at the speed reduction ratio R2. As a result, the phase is delayed.

Accordingly, as long as the direction of the relative rotation between the output shaft of the electric motor 2060 and the sprocket 2010 remains unchanged, the phase of the intake valve 1100 may be advanced or delayed in both the phase region 2500 that extends from the most delayed phase to CA1 and the phase region 2520 that extends from the CA2 to the most advanced phase. In this case, in the phase region 2520 that extends from CA2 to the most advanced phase, the phase is advanced or delayed by an amount larger than that in the phase region 2500 that extends from the most delayed phase to CA1. Accordingly, the phase region 2520 is broader in the phase change width than the phase region 2500.

In the phase region 2500 that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is not operating, the rotation of the output shaft of the electric motor 2060, which is caused by the torque applied to the intake camshaft 1120, is restricted. This restricts occurrence of an undesirable phase change, that is, the deviation of the actual phase from the phase used in the control.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is brought into a state in which combustion stably takes place in the engine 1000.

When the phase of the intake valve 1100 is within the phase region 2510 that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the phase region 2500 to the phase region 2520, or from the phase region 2520 to the phase region 2500, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

The speed reduction ratio R(θ) in FIG. 9 corresponds to the reciprocal of the ratio of the amount of change in the phase of the intake valve 1100 with respect to the operation amount of the electric motor 2060 (the relative rotational speed between the output shaft of the electric motor 2060 and the sprocket 2010). Namely, the phase region 2500 in which the speed reduction ratio is high may be regarded as a "first phase region" according to the invention, and the other phase regions 2510 and 2520 may be collectively regarded as a "second phase region" according to the invention.

With the intake VVT mechanism 2000 of the variable valve timing system according to the embodiment of the invention, when the phase of the intake valve 1100 is within the phase region 2500 that extends from the most delayed phase to CA1, the speed reduction ratio that the elements of the intake VVT mechanism 2000 realize in cooperation is R1. When the phase of the intake valve 1100 is within the phase region 2520 that extends from CA2 to the most advanced phase, the speed reduction ratio that the elements of the intake VVT mechanism 2000 realize in cooperation is R2 that is lower than R1. Accordingly, as long as the direction in which the output shaft of the electric motor 2060 remains unchanged, the phase of the intake valve 1100 may be advanced or delayed in both the phase region 2500 that extends from the most delayed phase to CA1 and the phase region 2520 that extends from the CA2 to the most advanced phase. In this case, in the phase region 2520 that extends from CA2 to the most advanced phase, the phase is advanced or delayed by an amount larger than that in the phase region 2500 that extends from the most delayed phase to CA1. Accordingly, the phase region 2520 is broader in the phase change width than the phase region 2500. In the phase region 2500 that extends from the most delayed phase to CA1, the speed reduction ratio is high. Accordingly, rotation of the output shaft of the electric motor 2060, which is caused by a torque applied to the intake camshaft 1120 in accordance with the operation of the engine, is restricted. This restricts the deviation of the actual phase from the phase used in the control. As a result, it is possible to change the phase in a broader range, and to control the phase more accurately.

Next, the configuration of the control over the phase of the intake valve 1100 (hereinafter, simply referred to as the "intake valve phase" where appropriate) will be described in detail.

Figure 11:
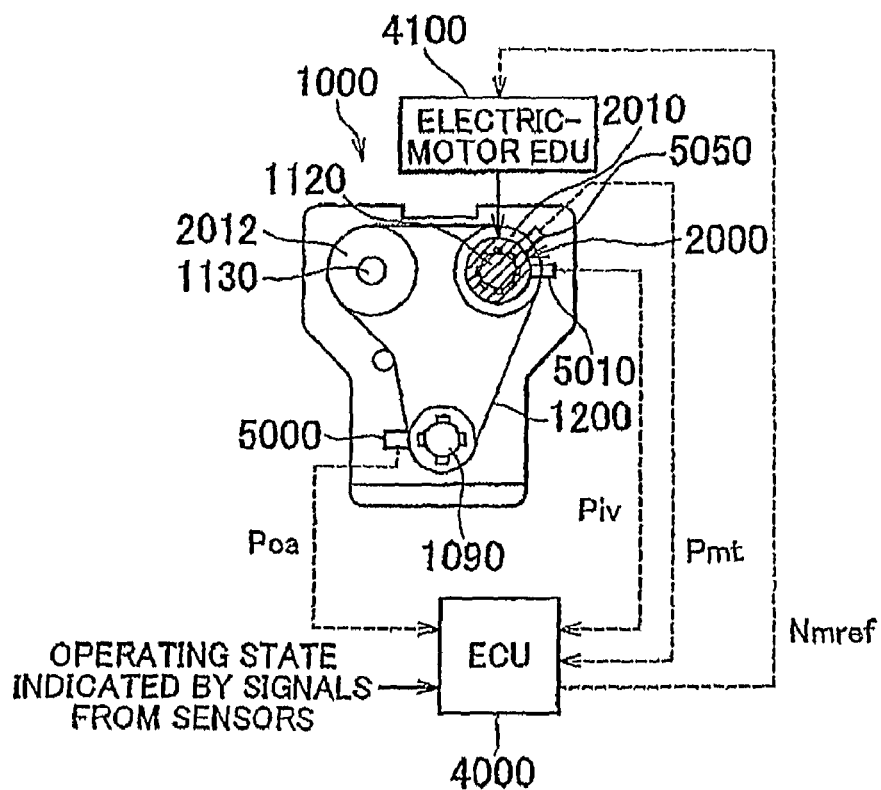
FIG. 11 is a schematic block diagram illustrating the configuration of the control over the phase of an intake valve, executed by the variable valve timing system according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to a rotor (not shown) of the electric motor 2060. These cam angle signal Ply, crank angle signal Pca and motor rotational angle signal Pmt are transmitted to the ECU 4000.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 produces a required output power. As part of the engine control, the ECU 4000 sets the target phase of the intake valve 1100 and the target phase of the exhaust valve 1110 based on the map shown in FIG. 2. In addition, the ECU 4000 prepares the rotational speed command value Nmref for the electric motor 2060 that serves as the actuator for the intake VVT mechanism 2000. If the electric motor 2060 rotates at the rotational speed command value Nmref, the phase of the intake valve 1100 matches the target phase.

The rotational speed command value Nmref is set based on the relative rotational speed between the output shaft of the electric motor 2060 and the sprocket 2010 (the intake camshaft 1120), which corresponds to the operation amount of the actuator, as described in detail below. An electric-motor EDU (Electronic Drive Unit) 4100 controls the rotational speed of the electric motor 2060 based on the rotational speed command value Nmref indicated by a signal from the ECU 4000.

When the engine 1000 is going to stop, more specifically, after a command to stop the engine 1000 is issued, the target value of the phase (target phase) of the intake valve 1100 (hereinafter, referred to as the "intake valve phase" where appropriate) is set to the stop-time phase that is suitable for start-up of the engine in order to facilitate the subsequent engine starting. Namely, if it is determined that the intake valve phase differs from the stop-time phase (i.e., if the stop-time phase has not been achieved) when a command to stop the engine 1000 is issued, the variable valve timing system needs to change the intake valve phase.

Figure 12:
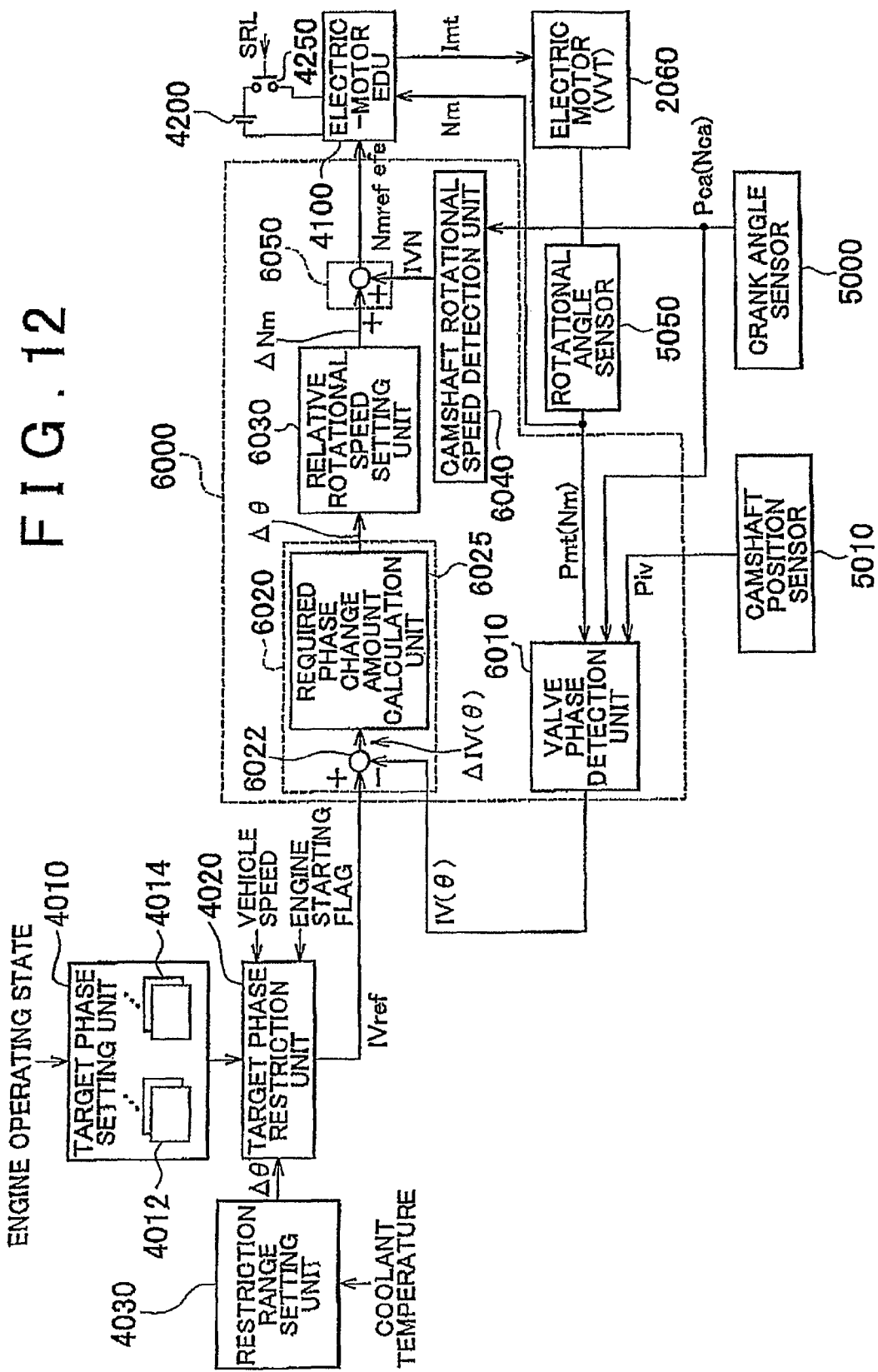
FIG. 12 is a block diagram illustrating the control over the rotational speed of an electric motor that serves as an actuator of the variable valve timing system according to the embodiment of the invention.

FIG. 12 is a block diagram illustrating the control over the rotational speed of an electric motor 2060 that serves as the actuator of the intake VVT mechanism 2000 according to the embodiment of the invention.

Figure 2:
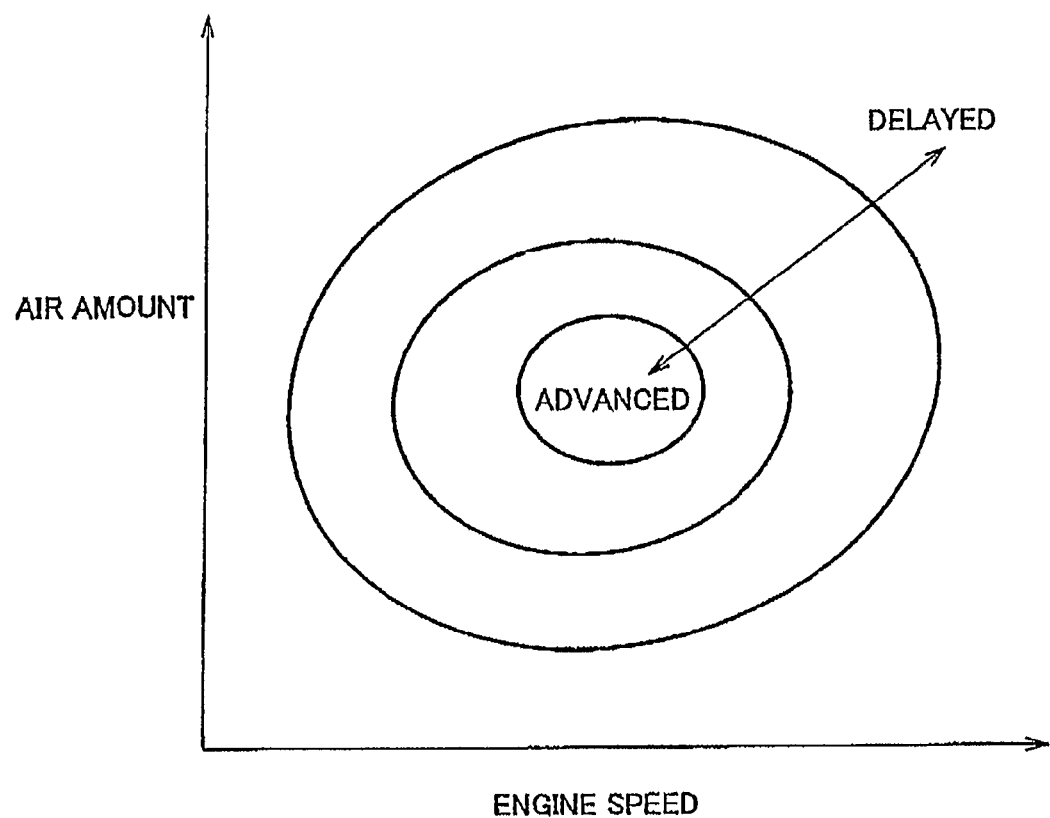
FIG. 2 is a graph showing the map that defines the phase of an intake camshaft.

As shown in FIG. 12, a target phase setting unit 4010 sets the target phase value IVref for the intake valve 1100, which is the target of the variable valve timing control, based on the parameters indicating the engine operating state, with reference to an on-load operation map 4012 that is used during the load operation, and a no-load operation map 4014 that is used during the no-load operation. Each of the on-load operation map 4012 and the no-load operation map 4014 is prepared for each of multiple engine temperatures (more specifically, coolant temperatures). For example, with reference to the on-load operation map 4012, the target phase value IVref is set based on the engine speed and the intake air amount, as shown in FIG. 2. With reference to the no-load operation map 4014, the target phase value IVref is set based on the engine speed.

A target phase restriction unit 4020 restricts the target phase value IVref in the predetermined engine operating state (typically, in the operating state in which an engine stop command may be issued, for example, when the engine is being started or when the vehicle is not running), such that the intake valve phase is reliably brought into the phase region 2500, in which the speed reduction is high, by the time the engine is stopped. As described below in detail, the target phase restriction unit 4020 restricts the target phase value IVref to a restriction range. When the target phase value IVref is within the restriction range, the intake valve phase is reliably returned to the phase region 2500 by the operation of the electric motor 2060 during the period from when an engine stop command is issued until when the engine is stopped. A restriction range setting unit 4030 variably sets the restriction range used by the target phase restriction unit 4020 based on the coolant temperature that indicates the engine temperature.

As described above, the target phase value IVref of the intake valve 1100 is basically set by the target phase setting unit 4010 based on the engine operating state. In addition, in the operating state in which an engine stop command may be issued, the target phase value IVref is restricted by the target phase restriction unit 4020 and the restriction range setting unit 4030.

An actuator operation amount setting unit 6000 prepares the rotational speed command value Nmref for the electric motor 2060 based on the deviation of the current actual phase IV($\theta$) of the intake valve 1100 (hereinafter, referred to as the "actual intake valve phase IV($\theta$)" where appropriate) from the target phase value IVref. The rotational speed command value Nmref is set such that the actuator operation amount at which the actual intake valve phase IV($\theta$) matches the target phase value IVref is achieved.

The actuator operation amount setting unit 6000 includes a valve phase detection unit 6010; a camshaft phase change amount calculation unit 6020; a relative rotational speed setting unit 6030; a camshaft rotational speed detection unit 6040; and a rotational speed command value preparation unit 6050. The function of the actuator operation amount setting unit 6000 is exhibited by executing the control routines stored in advance in the ECU 4000 in predetermined control cycles.

The valve phase detection unit 6010 calculates the actual intake valve phase IV($\theta$) based on the crank angle signal Pca from the crank angle sensor 5000, the cam angle signal Ply from the camshaft position sensor 5010, and the motor rotational angle signal Pmt from the rotational angle sensor 5050 for the electric motor 2060.

The camshaft phase change amount calculation unit 6020 includes a calculation unit 6022 and a required phase change amount calculation unit 6025. The calculation unit 6022 calculates the deviation $\Delta IV(\theta)$ ($\Delta IV(\theta)=IV(\theta)-IVref$) of the intake valve phase $IV(\theta)$ from the target phase value IVref. The required phase change amount calculation unit 6025 calculates the amount $\Delta\theta$ by which the phase of the intake camshaft 1120 is required to change in the current control cycle based on the deviation $\Delta IV(\theta)$ calculated by the calculation unit 6022.

For example, the maximum value $\Delta\theta max$ of the phase change amount $\Delta\theta$ in a single control cycle is set in advance. The required phase change amount calculation unit 6025 sets the phase change amount $\Delta\theta$, which corresponds to the deviation $\Delta IV(\theta)$ and which is equal to or smaller than the maximum value $\Delta\theta max$. The maximum value $\Delta\theta max$ may be a fixed value. Alternatively, the maximum value $\Delta\theta max$ may be variably set by the required phase change amount calculation unit 6025 based on the operating state of the engine 1000 (the engine speed, the intake air amount, etc.) and the degree of the deviation $\Delta IV(\theta)$. The camshaft phase change amount calculation unit 6020 determines whether the intake valve phase $IV(\theta)$ has reached the target phase value IVref. If it is determined that the intake valve phase $IV(\theta)$ has reached the target phase value IVref, the camshaft phase change amount calculation unit 6020 sets the phase change amount $\Delta\theta$ to zero ($\Delta\theta=0$).

The relative rotational speed setting unit 6030 calculates the rotational speed $\Delta Nm$ of the output shaft of the electric motor 2060 relative to the rotational speed of the sprocket 2010 (the intake camshaft 1120). The rotational speed $\Delta Nm$ needs to be achieved in order to obtain the required phase change amount $\Delta\theta$ calculated by the required phase change amount calculation unit 6025. For example, the relative rotational speed $\Delta Nm$ is set to a positive value ($\Delta Nm>0$) when the phase of the intake valve 1100 is advanced. On the other hand, when the phase of the intake valve 1100 is delayed, the relative rotational speed $\Delta Nm$ is set to a negative value ($\Delta Nm<0$). When the current phase of the intake valve 1100 is maintained ($\Delta\theta=0$), the relative rotational speed $\Delta Nm$ is set to a value substantially equal to zero ($\Delta Nm=0$).

The relationship between the phase change amount $\Delta\theta$ per unit time $\Delta T$ corresponding to one control cycle and the relative rotational speed $\Delta Nm$ is expressed by Equation 1 shown below. In Equation 1, $R(\theta)$ is the speed reduction ratio that changes in accordance with the phase of the intake valve 1100, as shown in FIG. 9.

$$\Delta\theta \propto \Delta Nm \times 360° \times (1/R(\theta)) \times \Delta T \qquad \text{Equation 1}$$

According to Equation 1, the relative rotational speed setting unit 6030 calculates the rotational speed $\Delta Nm$ of the electric motor 2060 relative to the rotational speed of the sprocket 2010, the relative rotational speed $\Delta Nm$ being required to be achieved to obtain the required phase change amount $\Delta\theta$ of the camshaft during the control cycle $\Delta T$.

The camshaft rotational speed detection unit 6040 calculates the rotational speed of the sprocket 2010, namely, the actual rotational speed IVN of the intake camshaft 1120 by dividing the rotational speed of the crankshaft 1090 by two. Alternatively, the camshaft rotational speed detection unit 6040 may calculate the actual rotational speed IVN of the intake camshaft 1120 based on the cam angle signal Piv from the camshaft position sensor 5010. Generally, the number of cam angle signals output during one rotation of the intake camshaft 1120 is smaller than the number of crank angle signals output during one rotation of the crankshaft 1090. Accordingly, the accuracy of detection is enhanced by detecting the camshaft rotational speed PIN based on the rotational speed of the crankshaft 1090.

The rotational speed command value preparation unit 6050 prepares the rotational speed command value Nmref for the electric motor 2060 by adding the actual rotational speed IVN of the intake camshaft 1120, which is calculated by the camshaft rotational speed detection unit 6040, to the relative rotational speed $\Delta Nm$ set by the relative rotational speed setting unit 6030. A signal indicating the rotational speed command value Nmref prepared by the rotational speed command value preparation unit 6050 is transmitted to the electric-motor EDU 4100.

The electric-motor ECU 4100 is connected to a power supply 4200 via a relay circuit 4250. The on/off state of the relay circuit 4250 is controlled based on the control signal SRL. The power supply 4200 is usually formed of a secondary battery that is electrifiable when the engine is operating.

The electric-motor EDU 4100 executes the rotational speed control such that the rotational speed of the electric motor 2060 matches the rotational speed command value Nmref. For example, the electric-motor EDU 4100 controls the on/off state of a power semiconductor element (e.g. a transistor) to control the electric power supplied to the electric motor 2060 (typically, the magnitude of electric current Imt passing through the electric motor and the amplitude of the voltage applied to the electric motor) based on the deviation (Nmref−Nm) of the actual rotational speed Nm of the electric motor 2060 from the rotational speed command value Nmref. For example, the duty ratio used in the on/off operation of the power semiconductor element is controlled.

The electric-motor EDU 4100 controls the duty ratio DTY that is adjustment amount used in the rotational speed control according to Equation 2 indicated below, in order to control the electric motor 2060 more appropriately.

$$DTY=DTY(ST)+DTY(FB) \qquad \text{Equation 2}$$

In Equation 2, DTY(FB) is a feedback term based on the control calculation using the above-described deviation and a predetermined control gain (typically, common P control or PI control).

Figure 13:
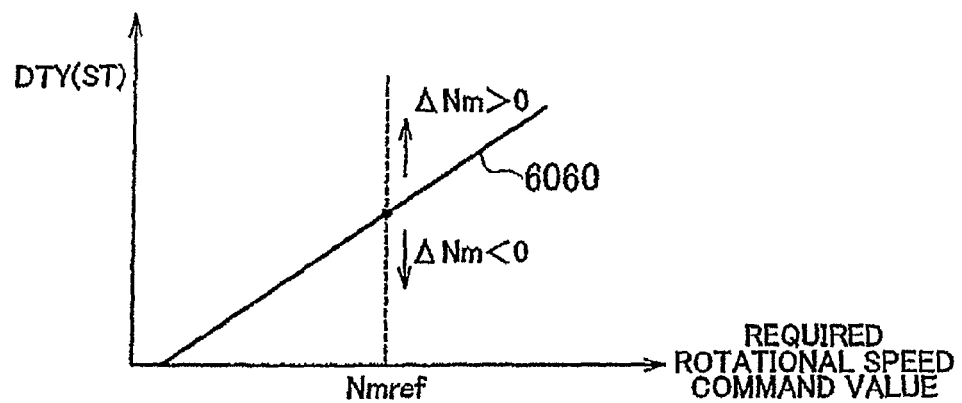
FIG. 13 is a graph illustrating the control over the rotational speed of the electric motor.

DTY(ST) in Equation 2 is a preset term that is set based on the rotational speed command value Nmref for the electric motor 2060 and the set relative rotational speed $\Delta Nm$, as shown in FIG. 13.

As shown in FIG. 13, a duty ratio characteristic 6060 corresponding to the motor current value required when the relative rotational speed $\Delta Nm$ is zero ($\Delta Nm=0$), namely, when the electric motor 2060 is rotated at the same rotational speed as the sprocket 2010 based on the rotational speed command value Nmref is presented in a table in advance. DTY(ST) in Equation 2 is set based on the duty ratio characteristic 6060. Alternatively, DTY(ST) in Equation 2 may be set by relatively increasing or decreasing the value of the duty ratio corresponding to the relative rotational speed $\Delta Nm$ from the reference value based on the duty ratio characteristic 6060. The rotational speed control, in which the electric power supplied to the electric motor 2060 is controlled using both the preset term and the feedback term in combination, is executed. In this way, the electric-motor EDU 4100 causes the rotational speed of the electric motor 2060 to match the rotational speed command value Nmref, even if it changes, more promptly than in a simple feedback control, namely, the rotational speed control in which the electric power supplied to the electric motor 2060 is controlled using only the feedback term DTY(FB) in Equation 2.

Next, the operations of the target phase restriction unit 4020 and the restriction range setting unit 4030 shown in FIG. 12 will be described in detail.

With the variable valve timing system according to the embodiment of the invention, the intake valve phase when the engine is started (the engine-start time phase) is set within the phase region 2500, shown in FIG. 9, in which the speed reduction ratio is high. Especially, in vehicles in which the engine intermittent operation is automatically performed such as a vehicle provided with an economy running system that automatically stops an engine when the engine starts idling, and a hybrid vehicle that is able to run using only a motor as a drive power source, preferably, the start-time pressure reduction control for setting the start-time phase to the most delayed phase is executed to reduce the vibration when the engine is started.

Figure 14:
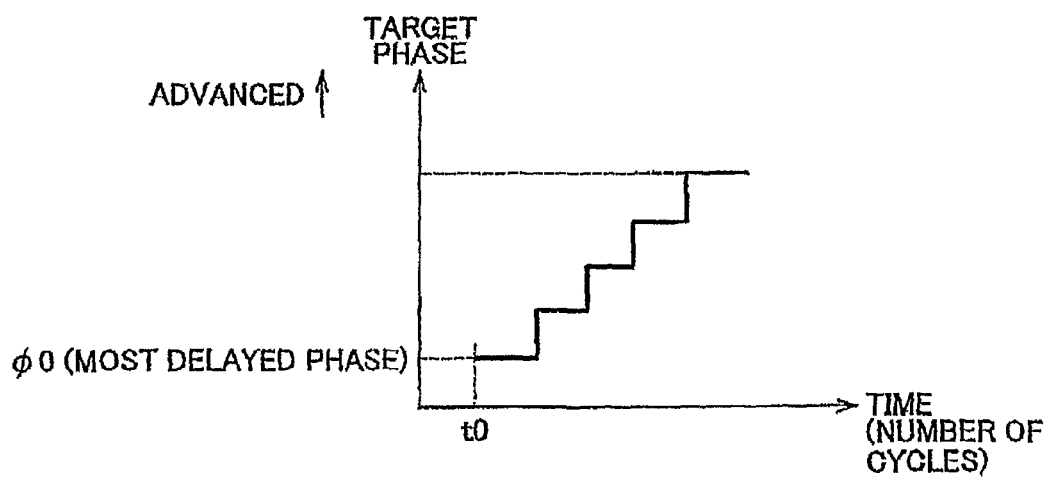
FIG. 14 is a graph illustrating the control over the phase of the intake valve, which is executed when the engine is started.

The following description concerning the embodiment of the invention will be provided on the assumption that the target phase setting unit 4010 sets the target phase value IVref to the most delayed phase (IVref=θ0) after an engine stop command is issued, in order to facilitate the subsequent engine starting, as shown in FIG. 14. After the engine stop command is issued, the intake valve phase is controlled to change toward the most delayed phase. Examples of an engine stop command include an engine stop command issued in response to an operation performed by the driver, typically, an operation to turn off an ignition switch, and an engine stop command that is automatically produced by the engine automatic stop control executed in, for example, a hybrid vehicle or a vehicle provided with an economy running system.

Thus, the start-time pressure reduction control for reducing the pressure in the combustion chamber is executed by the following initial setting for the amount of air introduced into the combustion chamber. According to the initial setting, the air once taken in through the intake valve 1100 is returned to the intake passage, the intake valve 1100 is closed, and then the compression stroke is started. Because the pressure in the intake passage is equal to the atmospheric pressure when the engine is being started, the air is taken in the combustion chamber more efficiently when the engine is being started than when the engine is continuously operating, and the expansion of the air-fuel mixture caused by the initial ignition tends to produce a great shock. However, according to the embodiment of the invention, a torque produced by the initial expansion of the air-fuel mixture that takes place in the engine is reduced to suppress vibration of the engine, and resistance to the cranking operation is reduced to start the engine more smoothly.

The target phase setting unit 4010 sets the target phase value IVref to the most delayed phase $\phi 0$ when start-up of the engine is initiated (time t0). After start-up of the engine is initiated, the target phase value IVref is set based on the engine operating state, as described above. At this time, the target phase value IVref may be gradually changed to avoid an abrupt change in the intake valve phase, as shown in FIG. 14.

Figure 15:
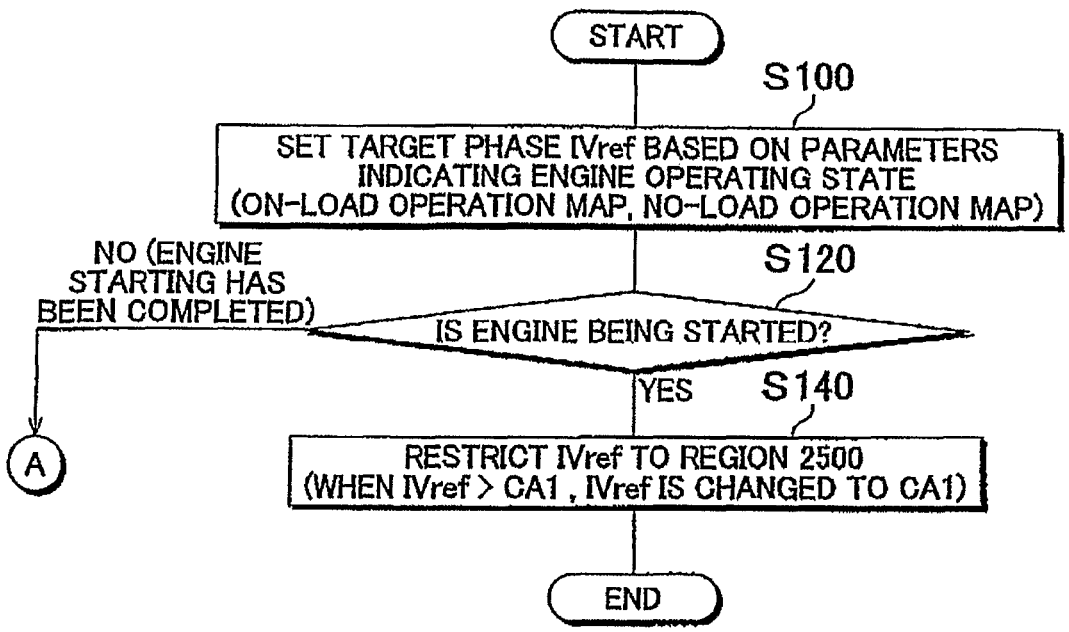
FIG. 15 is a first flowchart illustrating the operation of a target phase restriction unit and a restriction range setting unit shown in FIG. 12.
Figure 16:
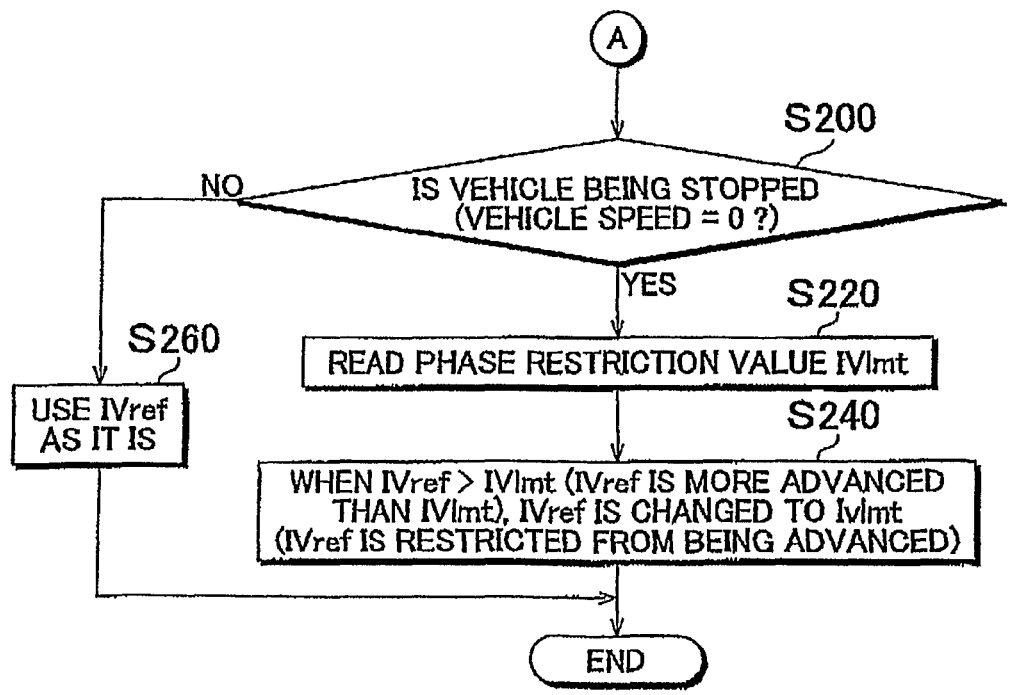
FIG. 16 is a second flowchart illustrating the operation of the target phase restriction unit and a restriction range setting unit.

FIGS. 15 and 16 are flowcharts illustrating the manner in which the target phase restriction unit 4020 and the restriction range setting unit 4030 shown in FIG. 12 restrict the target phase value. The routines for restricting the target phase value according to the flowcharts in FIGS. 15 and 16 are executed when the engine is operating, namely, when an engine stop command has not been issued. The routines are realized by executing, for example, the programs stored in advance in the ECU 4000 at predetermined control cycles.

As shown in FIG. 15, in step S100, the ECU 4000 sets the target phase value IVref based on the parameters indicating the engine operating state. The process in step S100 corresponds to the operation of the target phase setting unit 4010 shown in FIG. 12.

The ECU 4000 determines in step S120 whether the engine is being started. The determination in step S120 may be made based on, for example, an engine starting flag that is turned on in response to issuance of an engine start command and turned off in response to start of the self-operating of the engine.

When it is determined that the engine is being started ("YES" in step S120), the ECU 4000 restricts the target phase value IVref to the phase region 2500 in which the speed reduction ratio is high in step S140. Namely, when the target phase value IVref set by the target phase setting unit 4010 in step S100 is more advanced than the boundary value CA1 of the phase region 2500 shown in FIG. 9, the target phase value IVref is changed to CA1. The processes in steps S120 and S140 correspond to the operation of the target phase restriction unit 4020 in FIG. 12.

Thus, even when the engine is stopped in response to the operation for turning off the ignition switch performed by the driver while the engine is being started, the intake valve phase is reliably maintained within the phase region 2500. As a result, it is possible to prevent occurrence of an undesirable change in the valve timing when the engine is being stopped.

On the other hand, when it is determined that starting of the engine has been completed ("NO" in step S120), the ECU 4000 determines in step S200 whether the vehicle is not running based on the vehicle speed detected by a vehicle speed sensor (not shown).

When it is determined that the vehicle is not running ("YES" in step S200), the ECU 4000 executes steps S220 and S240 to restrict the target phase value IVref such that the target phase value IVref is not set to a value more advanced than the phase restriction value IVlmt. When the vehicle is not running even after the engine is started, the engine is usually operating under no-load conditions (i.e., the engine is idling). In a hybrid vehicle, when the remaining battery charge is low, the engine is sometimes operated under load conditions because the electric motor is rotated to charge the battery. In these cases, the target phase value IVref is set in step S100 with reference to the on-load operation map 4012 and the no-load operation map 4014.

Figure 17:
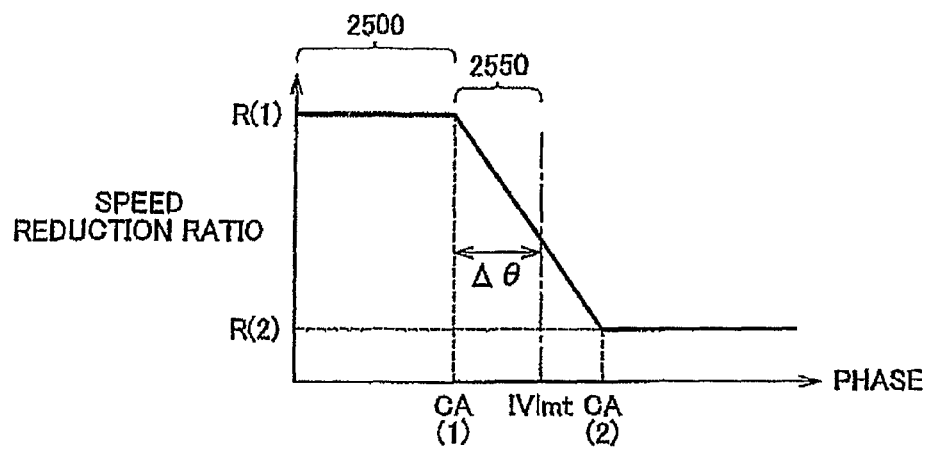
FIG. 17 is a graph illustrating the manner in which the target phase value is restricted by the target phase restriction unit and the restriction range setting unit.

As shown in FIG. 17, the phase restriction value IVlmt is set to a value that is more advanced than the boundary value CM of the phase region 2500, in which the speed reduction ratio is high, by the amount of $\Delta\theta$. Thus, the target phase value IVref is restricted to the phase region 2500, in which the speed reduction ratio is high, and a region 2550. The difference between the boundary value CA1 of the phase region 2500 and a value in the phase region 2550 is $\Delta\theta$ at the maximum.

Thus, when the vehicle is not running, namely, when there is a high possibility that an engine stop command is issued in response to the operation performed by the driver to turn off the ignition switch or an engine stop command is automatically issued in a vehicle in which the engine intermittent operation is performed such as a hybrid vehicle, the intake valve phase is prevented from being apart by a large amount from the phase region 2500, in which the speed reduction ratio is high. Accordingly, when an engine stop command is issued while the vehicle is not running, the intake valve phase is reliably brought into the region 2500 by the time the engine is stopped. Accordingly, it is possible to prevent occurrence of an undesirable change in the valve timing when the engine is being stopped.

As shown in FIG. 13, the phase restriction value IVlmt is set such that Δθ (FIG. 17) that defines the range, to which the target phase value IVref used when the vehicle is not running is restricted, is variable based on the engine temperature (the coolant temperature). More specifically, based on the setting characteristic indicated by a solid line 7000, the phase restriction value IVlmt is set to θa (IVlmt=θa) when the engine temperature (the coolant temperature) is lower than the reference temperature Tj, while the phase restriction value IVlmt is set to the most advanced phase and the target phase value IVref is not restricted when the engine temperature is equal to or higher than the reference temperature Tj.

Thus, even when the engine temperature is low, that is, when it is difficult to achieve the required rate of change in the phase due to an increase in the viscosity of the lubricating oil even if the electric motor 2060 is rotated at a high speed, the target phase value IVref is set to the appropriate range. When the target phase value IVref is within the range, it is possible to bring the intake valve phase into the region 2500 by executing the intake valve phase control after an engine stop command is issued. The reference temperature Tj and the phase θa are empirically set by determining the engine temperature at which the target phase value IVref needs to be restricted and the rate of change in the phase, which is achievable at the above-described engine temperature.

Alternatively, based on the setting characteristics indicated by dashed lines 7010 and 7020, the phase restriction value IVlmt may be gradually delayed (Δθ in FIG. 17 is gradually decreased) as the engine temperature is gradually decreased.

Figure 18:
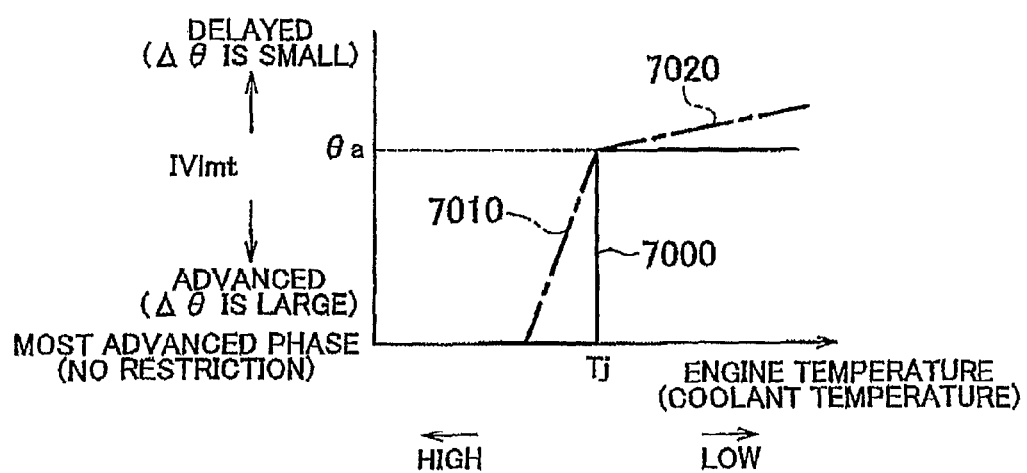
FIG. 18 is a graph illustrating the manner in which the restriction range of the target phase value is variably set by the restriction range setting unit.

As shown in FIG. 16, in step S220, the ECU 4000 reads the phase restriction value IVlmt in accordance with the engine temperature with reference to, for example, the map, shown in FIG. 18, which indicates the setting characteristics. Namely, the process in step S220 corresponds to the operation of the restriction range setting unit 4030.

In addition, in step S240, the ECU 4000 restricts the target phase value IVref to a value that is more delayed than the phase restriction value IVlmt (to the region 2500 and the region 2550 in FIG. 17). Namely, when the target phase value IVref set by the target phase setting unit 4010 in step S100 is more advanced than the phase restriction value IVlmt, the target phase value IVref is changed to the phase restriction value IVlmt (IVref=IVlmt). The process in step S240 corresponds to the operation of the target phase restriction unit 4020.

On the other hand, when the vehicle is running ("NO" in step S200), the ECU 4000 uses the target phase value IVref set in step S100 as the target value used in the intake valve phase control, without imposing any restrictions on the target phase value IVref.

With the variable valve timing system according to the embodiment of the invention described above, when the engine is operating, especially, when there is a possibility that an engine stop command is issued, the target value (the target phase value IVref) used in the intake valve phase control is restricted in consideration of the amount by which the phase can be changed by the operation of the actuator from when an engine stop command is issued until when the engine is stopped. Thus, the intake valve phase is reliably within the region 2500, in which the speed reduction ratio is high, when the engine is stopped. Accordingly, it is possible to prevent occurrence of an undesirable change in the valve timing when the engine is being stopped.

In the embodiment of the invention, the VVT mechanism 2000 (FIGS. 3 to 9) may be regarded as a "changing mechanism" according to the invention, the target phase setting unit 4010 and step S100 (FIG. 15) may be regarded as a "target phase setting unit" according to the invention, and the actuator operation amount setting unit 6000 may be regarded as a "phase control unit" according to the invention. The target phase restriction unit 4020 and steps S140 (FIG. 15) and S240 (FIG. 16) may be regarded as a "target phase restriction unit" according to the invention, and the restriction range setting unit 4030 and step S220 (FIG. 16) may be regarded as a "variable restriction range setting unit".

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A variable valve timing system that changes opening/closing timing of at least one of an intake valve and an exhaust valve provided in an engine, comprising:

a changing mechanism that changes the opening/closing timing by changing a rotational phase difference between a camshaft, which drives the valve of which the opening/closing timing is changed, and a crankshaft by an amount of change corresponding to an operation amount of an actuator, when the engine is operating, wherein the changing mechanism sets a ratio of the amount of change in the opening/closing timing with respect to the operation amount of the actuator to a lower value when the opening/closing timing is within a first phase region than when the opening/closing timing is within a second phase region;

a target phase setting unit that sets target opening/closing timing of at least one of the intake valve and the exhaust valve based on an operating state of the engine;

a phase control unit that sets the operation amount of the actuator based on a result of comparison between the target opening/closing timing and the actual opening/closing timing; and a target phase restriction unit that restricts the target opening/closing timing used when the engine is operating such that the opening/closing timing is within the first phase region when the engine is stopped due to the operation of the actuator after a command to stop the engine is issued.

2. The variable valve timing system according to claim 1, wherein
the target phase restriction unit restricts the target opening/closing timing to the first phase region when the engine is being started.

3. The variable valve timing system according to claim 1, wherein
the target phase restriction unit restricts the target opening/closing timing to a restriction range that includes the first phase region and a phase region that has a phase difference of equal to or smaller than a given amount with the first phase region, when a vehicle is not running.

4. The variable valve timing system according to claim 3, further comprising:
a variable restriction range setting unit that sets the given amount that defines the restriction range to which the target opening/closing timing is restricted by the target phase restriction unit based on a temperature of the engine.

5. The variable valve timing system according to claim 4, wherein
the variable restriction range setting unit sets the given amount to a relatively small value when the temperature of the engine is low.

6. The variable valve timing system according to claim 1, wherein
the first phase region includes a most delayed phase and a most advanced-side phase of the first phase region is more delayed than a predetermined phase, and the target phase setting unit sets the target opening/closing timing to the opening/closing timing at the most delayed phase after the command to stop the engine is issued.

7. The variable valve timing system according to claim 1, wherein
the actuator is formed of an electric motor, and the operation amount of the actuator corresponds to a rotational speed of the electric motor relative to a rotational speed of the camshaft.

8. The variable valve timing system according to claim 1, wherein
the operating state of the engine includes an engine speed and an intake air amount.

9. The variable valve timing system according to claim 8, wherein
the target phase setting unit sets the target opening/closing timing based on the engine speed and the intake air amount when the engine is operating under load conditions.

10. The variable valve timing system according to claim 8, wherein
the target phase setting unit sets the target opening/closing timing based on the engine speed when the engine is operating under no-load conditions.

11. The variable valve timing system according to claim 1, wherein
the target phase restriction unit restricts the target opening/closing timing before the command to stop the engine is issued while the engine is operating.

12. A method for controlling a variable valve timing system that changes opening/closing timing of at least one of an intake valve and an exhaust valve provided in an engine, and that includes a changing mechanism that changes the opening/closing timing by changing a rotational phase difference between a camshaft, which drives the valve of which the opening/closing timing is changed, and a crankshaft by an amount of change corresponding to an operation amount of an actuator, when the engine is operating, wherein the changing mechanism sets a ratio of the amount of change in the opening/closing timing with respect to the operation amount of the actuator to a lower value when the opening/closing timing is within a first phase region than when the opening/closing timing is within a second phase region, comprising:
setting target opening/closing timing of at least one of the intake valve and the exhaust valve based on an operating state of the engine;
setting the operation amount of the actuator based on a result of comparison between the target opening/closing timing and the actual opening/closing timing; and
restricting the target opening/closing timing used when the engine is operating such that the opening/closing timing is brought into the first phase region by the time the engine is stopped, by the operation of the actuator after a command to stop the engine is issued.

13. The method according to claim 12, further comprising:
restricting the target opening/closing timing to the first phase region when the engine is being started.

14. The method according to claim 12, further comprising:
restricting the target opening/closing timing to a restriction range that includes the first phase region and a phase region that has a phase difference of equal to or smaller than a given amount with the first phase region, when a vehicle is not running.

15. The method according to claim 14, further comprising:
setting the given amount that defines the restriction range to which the target opening/closing timing is restricted by the target phase restriction unit based on a temperature of the engine.

16. The method according to claim 15, wherein
the given amount is set to a relatively small value when the temperature of the engine is low.

17. The method according to claim 12, wherein
the first phase region includes a most delayed phase and a most advanced-side phase of the first phase region is more delayed than a predetermined phase, and the target opening/closing timing is set to the opening/closing timing at the most delayed phase after the command to stop the engine is issued.

18. The method according to claim 12, wherein
the actuator is formed of an electric motor, and the operation amount of the actuator corresponds to a rotational speed of the electric motor relative to a rotational speed of the camshaft.

19. The method according to claim 12, wherein
the operating state of the engine includes an engine speed and an intake air amount.

20. The method according to claim 19, wherein
the target opening/closing timing is set based on the engine speed and the intake air amount when the engine is operating under load conditions.

21. The method according to claim 19, wherein
the target opening/closing timing is set based on the engine speed when the engine is operating under no-load conditions.

22. The method according to claim 12, wherein
the target opening/closing timing is restricted before the command to stop the engine is issued while the engine is operating.

* * * * *